R. D. PARKER.
SUN AND RAIN SHIELD.
APPLICATION FILED AUG. 20, 1920.
1,403,620.
Patented Jan. 17, 1922.
2 SHEETS—SHEET 1.
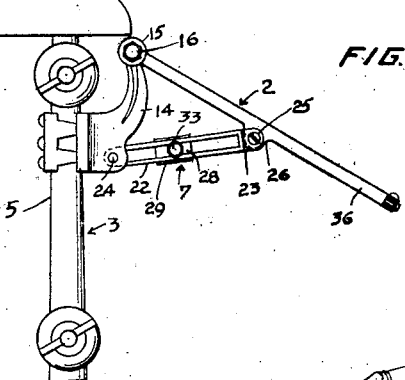
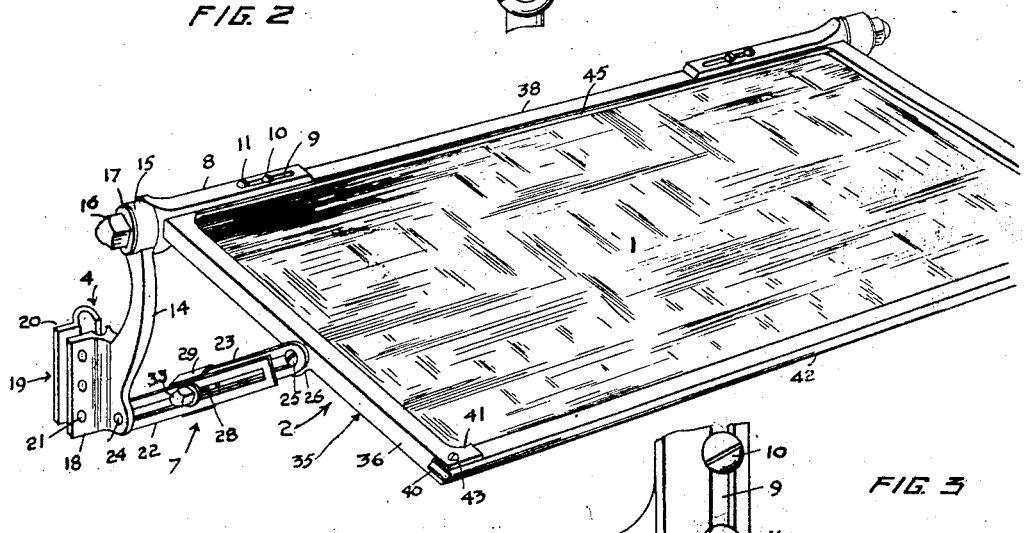
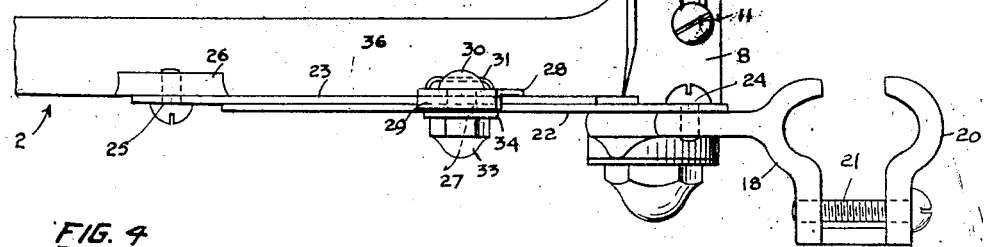
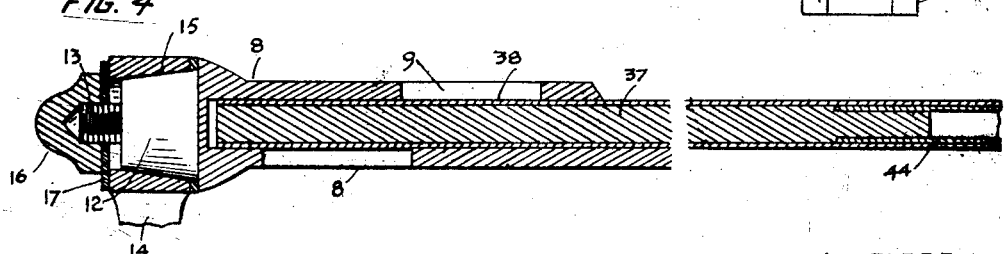
INVENTOR
R. D. PARKER
BY
ATT'YS R. D. PARKER.
SUN AND RAIN SHIELD.
APPLICATION FILED AUG. 20, 1920.
1,403,620.
Patented Jan. 17, 1922.
2 SHEETS—SHEET 2.
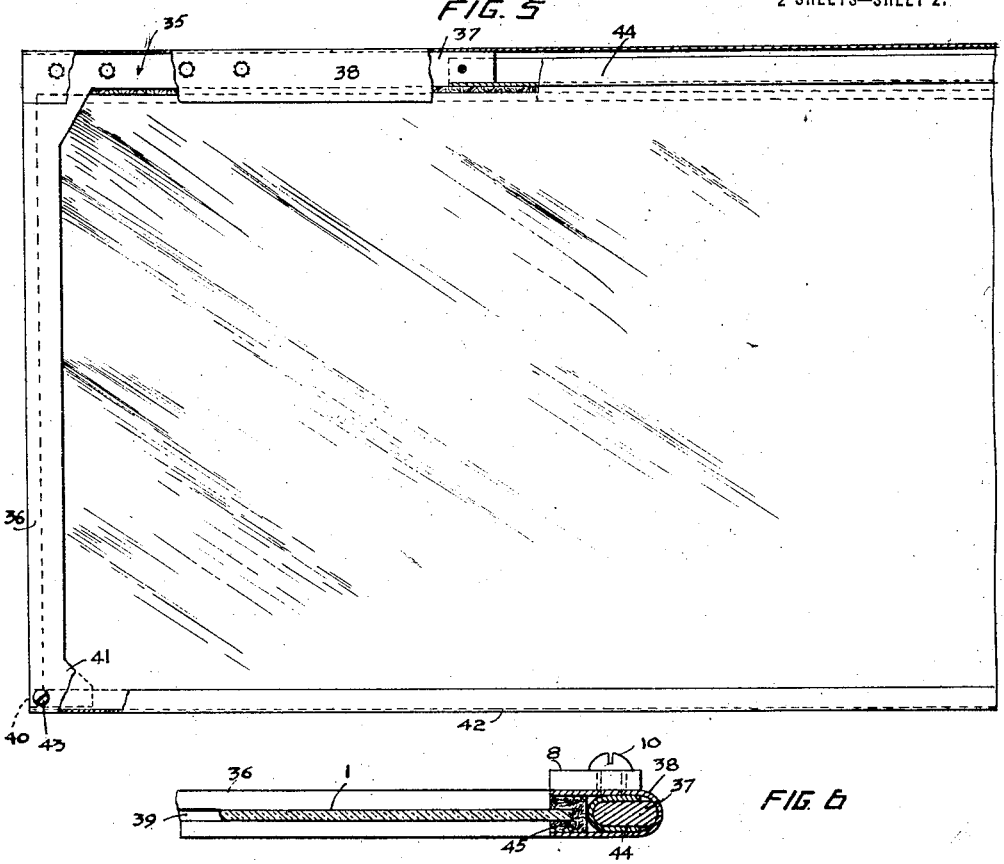
INVENTOR
R. D. PARKER
BY Wright & Chumm
ATT'YS

UNITED STATES PATENT OFFICE.

RALPH D. PARKER, OF SAN FRANCISCO, CALIFORNIA.

SUN AND RAIN SHIELD.

1,403,620.                     Specification of Letters Patent.     Patented Jan. 17, 1922.

Application filed August 20, 1920. Serial No. 404,756.

*To all whom it may concern:*

Be it known that I, RALPH D. PARKER, a citizen of the United States, residing at San Francisco, in the county of San Francisco and State of California, have invented new and useful Improvements in Sun and Rain Shields, of which the following is a specification.

This invention relates to improvements in sun and rain shields of the translucent type adapted to be attached to an automobile so as to extend obliquely downwardly in front of the wind shield to prevent the driver of the automobile from being temporarily blinded by the rays of the sun and to prevent rain from collecting on the wind shield and interfering with the driver's vision.

The primary object of this invention is to provide simply constructed, relatively light, strong, and durable shield which is not subject to breakage due to vibration, which is capable of being readily attached to and easily adjusted in proper position upon an automobile, which is provided with means of attachment of relatively small and simple construction, and which is so generally constructed and formed that when attached to an automobile will add to the appearance thereof.

The invention possesses other advantages and features, some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form, since the invention as expressed in the claims may be embodied in a plurality of forms.

Referring to the drawings:—

Figure 1 is a fragmentary side elevation of the shield of this invention.

Figure 2 is a fragmentary perspective view of the shield of this invention.

Figure 3 is a fragmentary bottom plan view of the shield at one corner thereof.

Figure 4 is a longitudinal sectional view along the upper edge of the shield at one corner and shown broken away.

Figure 5 is a top plan view of the shield with the clamping means removed, said shield having its frame broken away to illustrate the particular construction shown therein.

Figure 6 is a fragmentary cross-sectional view taken through one of the longitudinal frame members and a part of the glass of the shield.

Figure 7 is a side elevation of a modified form of the invention.

Figure 8 is a detail sectional view of a modified form of the invention.

Figure 9 is a sectional view of the adjustable clamping means for plates 22 and 23.

Referring particularly to the drawings, the present embodiment of the invention as shown therein comprises a rectangular glass shield 1 preferably formed of green glass so as to be translucent and obstruct the sun's rays. This glass shield 1 is held in place in a rectangular frame generally designated 2. The shield is of substantially the same width as the automobile wind shield which shield is generally designated 3 and of sufficient size so that when projecting obliquely downwardly in front of the wind shield, it will obstruct the sun's rays and prevent them from interfering with the vision of the driver of the automobile. At the ends of the shield 1 there are provided clamping devices 4 which provide for attachment of the shield to the wind shield stanchions 5. Operating in conjunction with the shield and clamping means are adjusting devices 7 which are operated to regulate the position of the glass shield and maintain the shield in adjusted position.

The clamping devices 4 comprise U-shaped clamp members 8 engaging upon opposite sides of the frame 2 along the upper edge thereof. These U-shaped clamps 8 are provided on opposite sides with slots 9, through which slots screws 10 and 11 are inserted and turn into the frame 2. By loosening these screws, the clamp members 8 may be adjusted longitudinally so as to provide for attachment of the glass shield to automobiles of various sizes. The intermediate portion of each clamp 8 carries a cone-shaped bearing 12, upon the outer end of which a screw threaded projection 13 extends. Arms 14 provided at their upper ends with enlarged apertured portions 15, are mounted for rotation upon said bearings 12, said bearings extending through the apertured portions 15. Nuts 16 and washers 17 are mounted on the projections 13 so as to hold the arms 14 in position upon the bearings. The arms 14 extend downwardly, then rearwardly and are formed integral at their lower ends with one element 18 of a clamp 19. The other element 20 of the clamp 19 is adjustably attached to the element 18 by means of screws or other fastening devices 21. The clamp elements 18 and 20 are adapted to embrace opposite sides of the stanchions 5 near the upper ends of said stanchions and by taking up on the screws 21 the elements 18 and 20 tightly clamp said stanchions so as to support the arms 14 in the position shown in Figure 1. The apertures through the enlarged portions 15 are shaped to correspond to the cone-bearing 12 so that by tightening up on the nuts 16 a wedging action is effected and the shield 1 will be held securely in position.

The devices 7 for holding the shield in adjusted position against rattling and vibrating unduly and for adjusting the shield comprise slotted arms or plates 22 and 23. The plate or arm 22 is pivoted as at 24 to the lower end of the arm 14 and the plate 23 is pivoted as at 25 to an apertured ear 26 formed intermediate of the ends of the end pieces of the frame 2. The plates 22 and 23 slidably engage one another and are adjustably connected by means of a screw or bolt 27 which latter is inserted through the slots in said plates. A plate 28 with side flanges 29 is mounted upon the arm 23 so that the flanges 29 embrace the side edges of the overlapped portions of the plates or arms 22 and 23. This prevents relative lateral movement of the arms, that is, the turning thereof on the bolt 27. The bolt 27 is inserted through this plate, being carried thereby and to prevent rotation of the bolt, the slotted head 30 of the bolt receives a short length of wire 31, which wire is fastened at its ends in the plates 28 on opposite sides of said head. This fastening is preferably provided for by openings 32 in the plate 28, the ends of the wire 31 being inserted through the openings and bent over to engage the inner surface of the plate. Upon the screw threaded portion of the bolt 27 there is mounted a nut 33 and a washer 34. When the nut 33 is tightened, the arms or plates 22 and 23 are held against relative adjustment and serve to support the shield in position. When the nut is loosened, the arms may be lengthened or shortened to effect the disposal of the shield in the desired position.

Referring particularly to the shield frame 2, said frame is constructed so as to be as rigid as possible commensurate with lightness of construction. In carrying out the frame construction, there are provided L-shaped castings 35, the longer portions of which constitute the end pieces 36 of the frame, whereas the shorter portions 37 act as reinforcing elements for the longitudinal frame piece 38 upon the upper side of the frame only. The portions 36 are grooved or channeled as at 39, so as to receive the end edges of the glass shield 1. The lower ends of the portions 36 are grooved transversely as at 40 and provided with an inwardly extending foot portions or enlargements 41, through which enlargements, the grooves 40 are cut. The bottom longitudinal frame piece 42 is formed of sheet metal bent into channel form so as to receive the glass shield 1 and the ends of this piece 42 are securely engaged in the slots 40. A screw 43 is passed through the ends of the frame pieces 36 and 42 to hold them in place. The frame piece 38 along the upper side of the frame is formed of sheet metal and bent into channel shape as is the frame piece 42. The frame piece 38 is welded at its ends to the upper ends of the portions 36 of the castings 35, in such a way that the portions 37 of said castings are received in the channel of said piece 38. These portions 37 extend from each end of the frame 2 a distance equal to substantially one-third of the length of the frame piece 38 so as to provide rigidity at the corners of the frame and adjacent to the upper side thereof. To reinforce the portion of the piece 38 between the ends of the portions 37, a sheet metal channel-shaped strip 44 is mounted in said channel piece 38. This strip 44 is disposed with the channel therein opening upwardly so as to receive the ends of the portions 37. Rivets or other fastening elements are passed through the pieces 37, 38 and 44 to securely hold them in place. The lower side of the strip 44 is spaced inwardly from the lower edge of the channel of the piece 38 and the portions 37 are correspondingly spaced so as to provide for accommodation of suitable packing 45 and the upper edge of the glass sheet 1 as shown particularly in Figure 6. This arrangement provides the necessary rigidity along the upper side of the frame without materially increasing the weight of the frame and shield as a whole. By having the L-shaped castings at the end and upper corners of the frame 2, and the other frame pieces associated therewith as hereinbefore disclosed and as illustrated in the accompanying drawings, the entire frame is made exceptionally rigid so that possibility of the glass working loose or breaking due to vibration, is eliminated.

Referring to the modification of the invention, the shield frame 50 is provided along the end edges thereof with rods 51 secured at their ends to said frame. Slidably mounted upon its rods are slide members 52. An arm 53 is pivotally connected at one end by a screw 54 with said member 52. The screw 54 works in a screw threaded opening 55 in said member 52 and is adapted to bear against the rod 51 and act as a set screw to hold the member 52 against movement upon the rod. The other end of the arm 53 is pivoted as at 56 to the clamp 57. The clamp 57 is the same as the one used in the preferred form of the invention and is provided with an upwardly extending arm 58 pivoted to the frame 50. In all respects this form of the invention is the same as the preferred form except as to the manner of securing the clamp 57 to the frame.

With this form of the invention, a greater range of adjustment is permitted the shield, because of the length of the frame 52.

I claim—

1. A sun and rain shield for automobiles comprising a translucent shield of rectilinear outline substantially L-shaped metal frame members extending along the end edges and part way along the upper longitudinal edges of the shield, a lower frame piece extending along the lower edge of the shield and secured at its ends to the adjacent ends of the frame piece and an upper frame piece secured to position on said L-shaped frame piece and extending along the upper edge of the shield, said last named frame piece being channeled to receive parts of the first named frame piece in the channel thereof.

2. A sun and rain shield for automobiles comprising a translucent shield of rectilinear outline substantially L-shaped metal frame members extending along the end edges and part way along the upper longitudinal edges of the shield, a lower frame piece extending along the lower edge of the shield and secured at its ends to the adjacent ends of the frame piece and an upper frame piece secured to position on said L-shaped frame piece and extending along the upper edge of the shield, said last named frame piece being channeled to receive parts of the first named frame piece in the channel thereof, and a reinforcing piece secured within the channel of the last named piece and to the first named frame piece.

3. A sun and rain shield for automobiles comprising a translucent shield of rectilinear outline of substantially L-shaped metal frame members extending along opposite end edges of the shield and part way along the upper edge of the shield a channeled frame piece mounted along the upper side of the shield and receiving portions of the first named frame piece a lower frame piece extending along the lower edge of the shield and connected with the first named frame piece.

4. A sun and rain shield for automobiles comprising a translucent shield of rectilinear outline, frame pieces engaging the end edges of the shield, additional frame pieces formed integral with the first named pieces and extending part way from the ends of the shield along the upper edge thereof, a channel frame piece extending along the upper edge of the channel and receiving the last named frame piece, a reinforcing strip in channel form receiving the ends of the second named frame piece and being disposed within the channel of the channel frame piece and means for securing said frame piece together.

5. A sun and rain shield for automobiles comprising a translucent shield of rectilinear outline, frame pieces engaging the end edges of the shield, additional frame pieces formed integral with the first named pieces and extending part way from the ends of the shield along the upper edge thereof, a channel frame piece extending along the upper edge of the channel and receiving the last named frame piece, a reinforcing strip in channel form receiving the ends of the second named frame piece and being disposed within the channel of the channel frame piece and means for securing said frame piece together, said first named frame piece grooved to receive the end edges of the shield, said second named frame pieces and the reinforcing channel being spaced from the rear edge of the channel frame piece to provide a space for receiving the upper edge of the shield.

RALPH D. PARKER.